(12) United States Patent
Greiner

(10) Patent No.: US 7,819,350 B2
(45) Date of Patent: Oct. 26, 2010

(54) GRATER FOR GRATABLE FOOD PRODUCTS

(75) Inventor: Ulrich Greiner, Neu-Ulm (DE)

(73) Assignee: MOHA Moderne Haushaltwaren AG, Vernier (CH)

( * ) Notice: Subject to any disclaimer, the term of this patent is extended or adjusted under 35 U.S.C. 154(b) by 0 days.

(21) Appl. No.: 12/321,483

(22) Filed: Jan. 21, 2009

(65) Prior Publication Data
US 2009/0212142 A1 Aug. 27, 2009

(30) Foreign Application Priority Data
Jan. 24, 2008 (CH) .......................... 97/08

(51) Int. Cl.
*A47J 43/25* (2006.01)
(52) U.S. Cl. ..................... 241/95; 241/273.2
(58) Field of Classification Search ................. 241/95, 241/100, 273.1–273.4
See application file for complete search history.

(56) References Cited

U.S. PATENT DOCUMENTS

| | | | |
|---|---|---|---|
| 3,552,460 A | 1/1971 | Cooney | |
| 7,648,088 B2 * | 1/2010 | Eikelenberg et al. | .......... 241/30 |
| 2005/0160894 A1 | 7/2005 | Canegallo | |

FOREIGN PATENT DOCUMENTS

| | | |
|---|---|---|
| DE | 201 17 358 U1 | 2/2002 |
| EP | 1 541 073 A1 | 6/2005 |
| EP | 1 554 962 B1 | 7/2005 |

* cited by examiner

*Primary Examiner*—Mark Rosenbaum
(74) *Attorney, Agent, or Firm*—Pauley Petersen & Erickson

(57) ABSTRACT

A grater for grating of gratable food products with different hardness degrees. A cylindrical grater container receives a driver element which is mounted rotatively moveable and which includes a plurality of guiding elements, and which carries a feed disk at the same time. The feed disk has an external thread which is actively connected with an internal thread integrally formed on the inner surface of the grater container, and which can be linearly moved through the grater container by rotation of the driver element, and can be pressed onto a product to be grated which is located in the grater container, and the product to be grated can be grated by a grater insert attached on the grating side.

12 Claims, 4 Drawing Sheets

FIG. 4
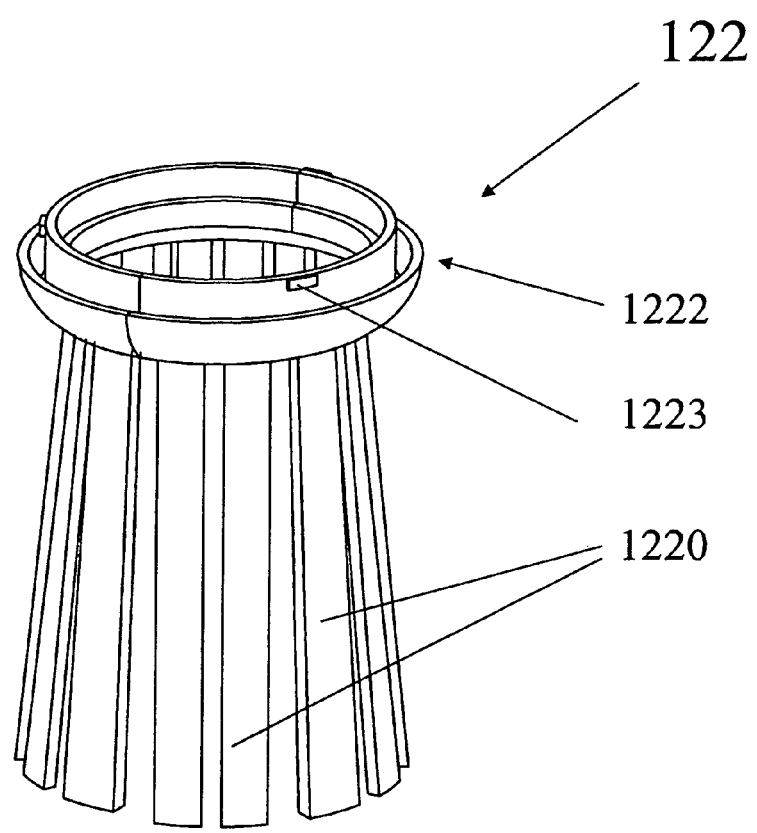
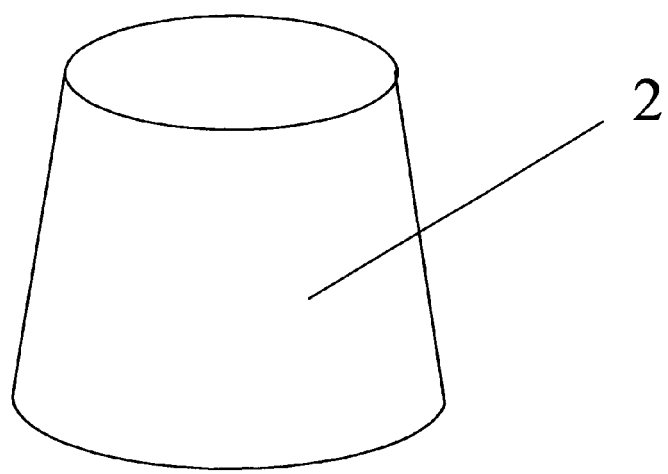

GRATER FOR GRATABLE FOOD PRODUCTS

BACKGROUND OF THE INVENTION

1. Field of the Invention

This invention relates to a grater for gratable food products with different hardness degrees, including a grater container which can be closed with a cover, in which a driver element with a plurality of guiding elements is rotatively supported, and in which a feed disk is supported linearly movable from an inserting side of the grater container to a grating side in a direction of a longitudinal axis of the grater container, wherein the product to be grated located in the grater container can be guided by the driver element across a grater insert which is mounted detachable on a grating side on the grater container.

2. Discussion of Related Art

Now, graters for grating of different food products, by which food can be grated conveniently and in an amount needed by the user, are increasingly employed in households.

In known graters, the food to be grated, the product to be grated, is stored movable in a cylindrical or conical grater container on a grater insert which has a plurality of through-holes. Projecting through an insertion side into the grater container is a plunger by which the product to be grated can be moved vertically downwards to be pressed onto the grater insert. The plunger is rotatably supported in the grater container, and during rotation of the plunger, the product to be grated is moved across the grater insert, thereby resulting in the grating of the product to be grated. The plunger can easily be pulled out of the grater container, and new products to be grated can be refilled in a fast and simple manner. If the user pulls the plunger out of the grater container, the product to be grated is exposed and can contact the environment. Such a grater carries the risk that the user unintentionally contacts product to be grated, or that pollution of the product to be grated can occur when removing the plunger. Another disadvantage of graters of the type described here is the varying height of the grater, wherein the height depends on the mass of the filled-in product to be grated. In most cases, it is not possible to store filled graters in a refrigerator so that a removal of the grated product and the storage in a separate container has to take place prior to the cooling.

A grater with a constant total height which is independent from the filling level is disclosed by European Patent Reference EP 1 554 962 B1. A cup-shaped grater container is mounted rotatably on a base plate from which a threaded rod having an external thread projects vertically upwards. The product to be grated is located in the grater container. A plunger which is moveable inside of the grater container and which has a central threaded hole is pressed by the rotation of the grater container in a vertical direction towards the base plate, whereby the product to be grated is pressed against a grater insert in the base plate. Because the grater container has a polygonal cross section, the product to be grated located in the grater container is carried along with the rotational movement of the grater container, whereby the product to be grated can be moved under pressure across the grater insert. The product to be grated can thus be grated by the rotational movement of the grater container.

The active connection between the threaded rod having an external thread and the moveable plunger which has an internal thread enables the grating of the product to be grated, wherein a total height is constant at any time, and the filled grater can thus be stored in the refrigerator. It is a negative effect that the interior of the grater container is centrically penetrated by the threaded rod, whereby the size of the gratable food is limited, or the product to be grated has to be adequately chopped up before filling into the grater, respectively.

It is not disclosed, if and how the grater taught by European Patent Reference EP 1 554 962 is secured against unintended opening and thus against unintended exposure of the product to be grated by a user.

SUMMARY OF THE INVENTION

One object of this invention is to provide a grater for gratable food products which allows the grater to receive bigger portions of food products in a grater container, wherein the total height remains constant independent of how much the grater container is filled, and as a result, the grater can be stored in the refrigerator even in the filled state.

In addition to this object, the grater according to this invention allows a simplified filling with food products, wherein the user does not contact the product to be grated.

BRIEF DESCRIPTION OF THE DRAWINGS

A plurality of embodiments of the subject matter of this invention are described in connection with the attached drawings, wherein:

FIG. 4 shows an exploded perspective view of a driver element with flexible guiding elements of an embodiment of the grater according to this invention for grating soft food products.

DETAILED DESCRIPTION OF THE INVENTION

Figure 1:
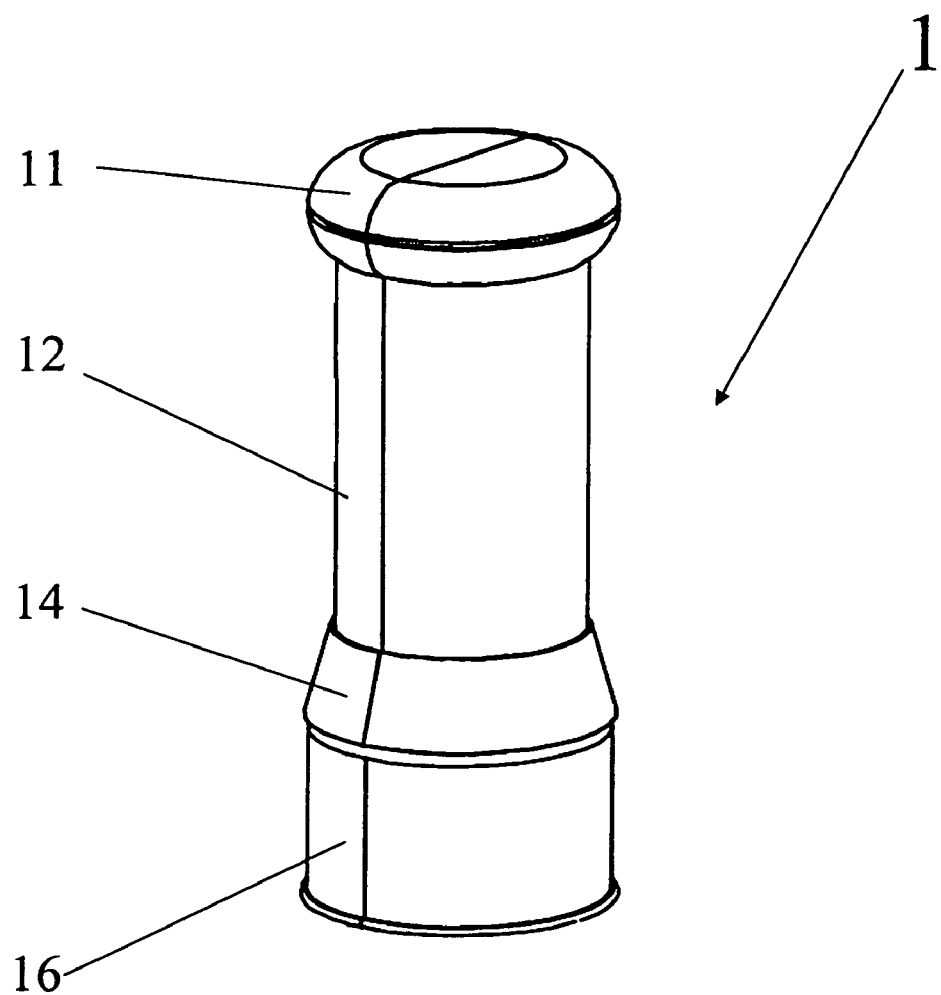
FIG. 1 shows a perspective view of a grater according to this invention.

A plurality of embodiments of a grater 1 according to this invention are described. The grater 1 comprises a grater container 12 which is formed cylindrical or conical, and which, in addition to an insertion side 120, has a grating side 124 arranged diametrically opposed to the insertion side 120.

The grater container 12 can be filled with product 2 to be grated in the form of different gratable food products of different hardness degrees and sizes, for example, with parmesan cheese, chocolate, or nuts. The product 2 to be grated is gratably stored within the grater container 12 by a mechanism which is described in more detail during the further description. In order to allow the rotation of the product 2 to be grated across a grater insert 13, the grater container 12 should have the form of a straight cylinder with a circular base area or the form of a right circular cone, respectively.

On the grating side 124, the grater insert 13 is detachably connected by a retainer ring 14 by a bayonet lock, or by a screw lock with the grater container 12. In one embodiment, a bayonet lock is provided, wherein a cam 140 engages at the retainer ring 14 in a slot 125 in the lower section of the grater 12 in the area of the grating side 124. The grater insert 13 is connected stationary and unmoveable with the grater container 12 by the retainer ring 14 on the grating side 124 so that during a movement of the product 2 to be grated within the grater container 12, the product 2 to be grated is grated by the grater insert 13.

To avoid undesired trickling of the product 2 to be grated through the grater insert 13 out of the grater container 12, an end cap 15 is provided which seals the retainer ring 14 on the opposite side of the grater insert 13. When a user wants a product 2 to be grated, to grate ahead with the grater 1, a collection container 16 is attached below the retainer ring 14 and is closed towards the bottom.

To rotate the product 2 to be grated within the grater container 12, and to grate it by the grater insert 13, the elements described below are necessary. A driver element 122, which comprises a collar 1222 and a plurality of guiding elements 1220, is inserted in the interior of the grater container 12, is connected force-locked with the grater container 12, and is therein rotatably mounted. The guiding elements 1220 run at least approximately parallel to the side walls of the grater container 12 from the insertion side 120 in direction of the grating side 124. The guiding elements 1220 do not project beyond the side walls of the grater container 12 and are flush with the grater insert 13 in the assembled state. The collar 1222 projects out of the insertion side 120 of the grater container 12, wherein the projection of the collar 1222 limits the insertion depth of the driver element 122 in the grater container 12.

The plurality of guiding elements 1220 can radially move the product 2 to be grated relative to the grater container 12. By this movement, the product 2 to be grated is guided across the grater insert 13 so that individual layers of the product 2 to be grated can be removed. Onto the individual guiding elements 1220, ribs 1221 are formed or can be mounted thereon detachable or non-detachable, whereby the retaining and the carrying along of the product 2 to be grated during the rotation can be achieved and improved. In the FIGS. 2 and 3, possible embodiments of the driver element 122 are illustrated, wherein three guiding elements 1220 are provided with one integrally formed rib 1221, respectively. The depth of the ribs, the section of the ribs 1221 projecting in direction of the rotational axis of the grater 1, is the same for all ribs 1221. The ribs 1221 move the food product and thus the product 2 to be grated relative to the grater container, wherein the ribs 1221 directly contact the product 2 to be grated.

Particularly when the product 2 to be grated is smaller, gratable food products such as chocolate or nuts, it is advantageous to design the rib depth of the ribs 1221 so that at least one rib 1221 projects further into the grater container 12, wherein the spanning of a rib 1221 to the center axis of the grater container 12 or beyond the center axis is advantageous.

The driver element 122 has a cover 11 which, in one possible embodiment, is connected by a bayonet lock with the collar 1222, which projects out of the grater container 12. At least one collar cam 1223 engages for a detachable fastening of the cover 11 at the collar 1222 into a suitable recess at the inner side of the cover 11, whereby the cover 11 is detachably connected with the driver element 122, which is rotatably mounted in the grater container 12.

Figure 2:
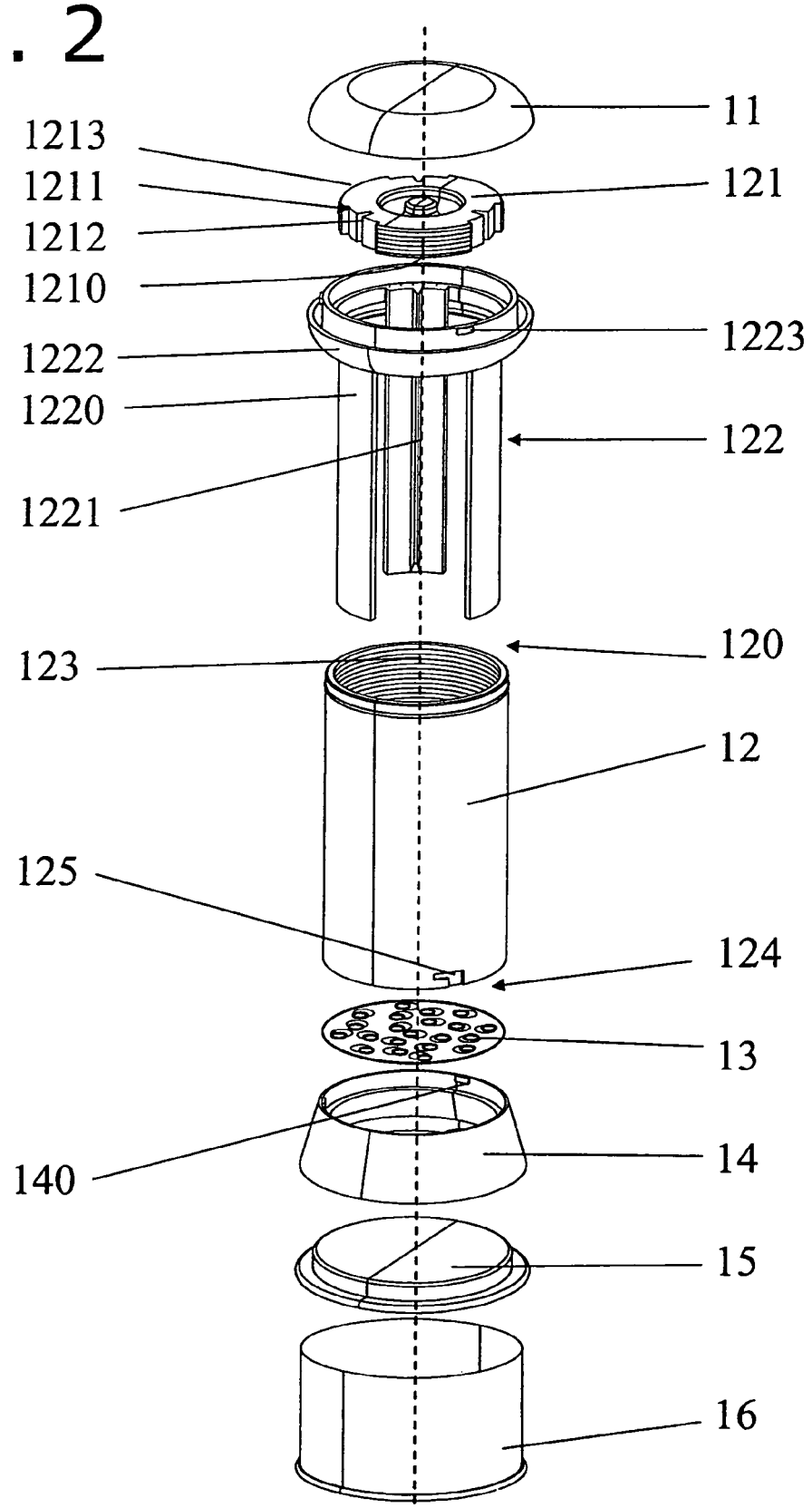
FIG. 2 shows an exploded perspective view of a first embodiment of a grater according to this invention, wherein a feed disk has a segmented external thread.

In FIG. 2, a first preferred embodiment of a grater 1 according to this invention is illustrated, which is described below. The inner side of the grater container 12 of the grater 1 has a continuous internal thread 123, wherein the turn of the internal thread 123 runs along on the entire inner surface of the grater container 12.

A feed disk 121 is provided which carries out the pressing-down of the product 2 to be grated onto the grater insert 13. This feed disk 121 is formed cylindrically and has an external thread 1210 which covers a portion of the circumferential surface 1213 of the feed disk 121. Thus, the external thread 1210 in this described first embodiment is formed segmented. In addition, into the circumferential surface 1213 of the feed disk 121, corresponding to the number of guiding elements 1220 of the respective driver element 122, guiding element recesses 1211 are formed which are actively connected with the guiding elements 1220. The feed disk 121 can be placed in the driver element 122 and can be moved with the driver element 122, guided by the plurality of guiding elements 1220.

After removal of the cover 11 from the collar 1222, the feed disk 121 is inserted into the grater container 12 through the collar 1222 of the driver element 122 in the area of or near the insertion side 120, wherein the external thread 1210 in the circumferential surface 1213 of the feed disk 121 engages with the internal thread 123 in the grater container 12. After fastening the cover 11 of the grater 1 on the collar 1222, the driver element 122 can be rotated within the grater container 12 by rotating the cover 11, wherein the cover 11 closes the space above the feed disk 121. This space above the feed disk 121 can serve, among other things, as a storage room for further grater inserts 13. By the interaction between the internal thread 123 and the external thread 1210, the feed disk 121 is rotated and linearly moved through the grater container 12 towards the grating side 124.

The guiding elements 1220 are mounted linearly unmoveable in the guiding element recesses 1211 between the feed disk 121 and the wall of the grater container 12, wherein the entire driver element 122 rotates within the grater container 12.

In the guiding element recesses 1211 at the feed disk 121, grooves 1212 are provided by which the ribs 1221 are guided, whereby a stable mounting of the feed disk 121 between the guiding elements 1220 of the driver element 122 is achievable, and a continuous and securely guided rotation of the feed disk 121 is ensured. Securing of the feed disk 121 by guiding the ribs 1221 of the guiding elements 1220 by the grooves 1212 can be advantageous to avoid wedging of the external thread 1210 in the internal thread 123.

The product 2 to be grated located in the grater container 12 rotates driven by the guiding elements 1220 of the driver element 122 and is pressed onto the grater insert 13 by a feed disk 121 lower side facing towards the grater insert 13, whereby the product 2 to be grated is grated.

To improve the pressing of the product 2 to be grated onto the grater insert 13, the lower side of the feed disk 121 has spikes which engage with the product 2 to be grated.

Figure 3:
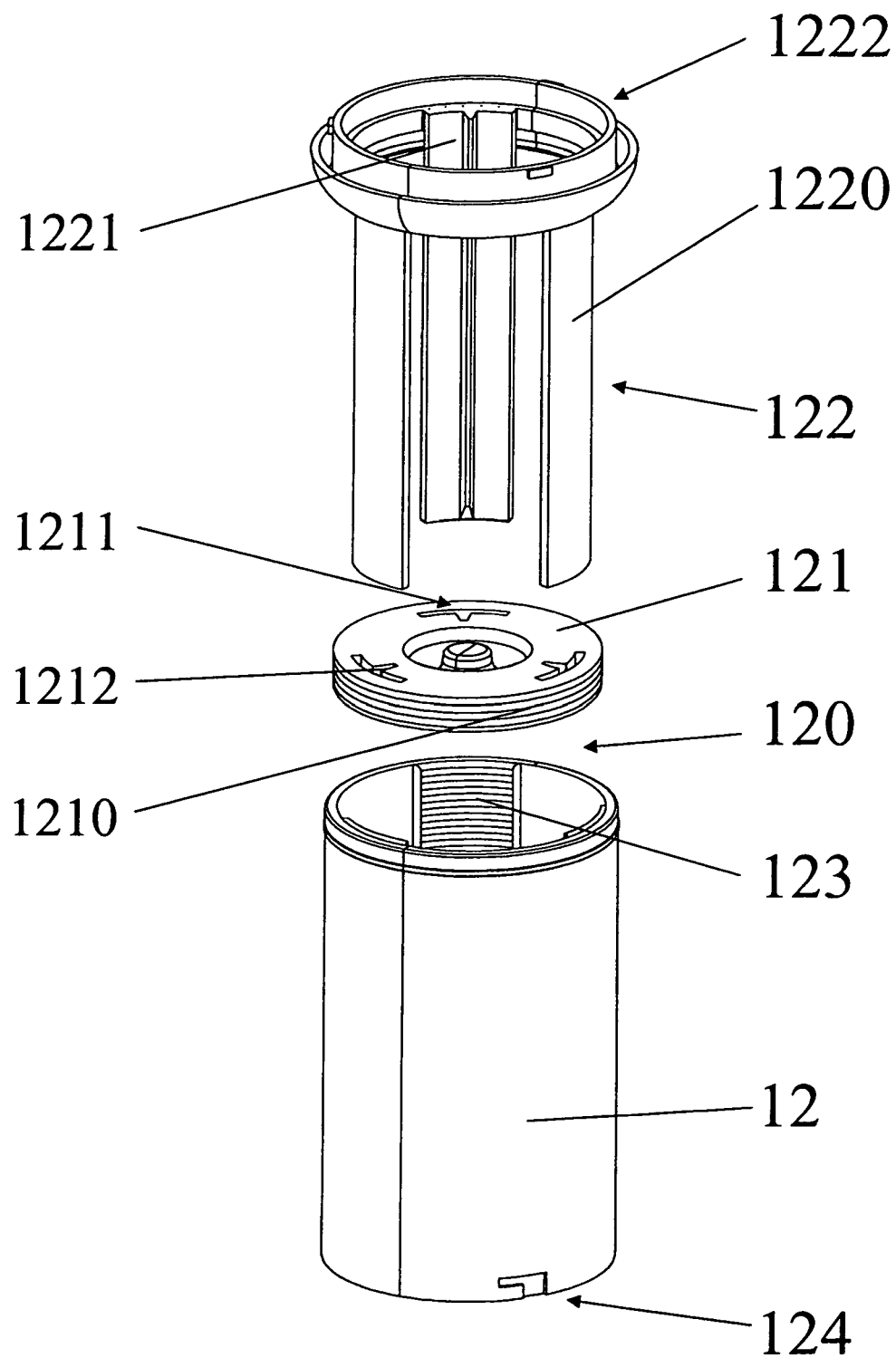
FIG. 3 shows an exploded perspective view of a further embodiment of a grater, wherein an internal thread in the grater container is formed in segments.

In a further embodiment of the grater 1 according to this invention, an external thread 1210 which is integrally formed in the circumferential surface 1213 of the feed disk 121, envelops the circumferential surface 1213 continuously. This second variation of an embodiment according to this invention, which is shown in FIG. 3, has the feed disk 121 comprising guiding element recesses 1211 which are milled-in spaced apart from the edge of the feed disk 121. Advantageously, each of the guiding element recesses 1211 has one recessed groove 1212, respectively, so that the guiding elements 1220 of the driver element 122 can be passed through the guiding element recesses 1211 and are retained securely and detachable. The tongue and groove connection between the guiding element recess 1211 and the guiding elements 1220 ensures that the feed disk 12 is rotatably driven and carried along in a controlled manner.

The grater container 12 which can be used with a feed disk 121 having a continuous external thread 1210 comprises a segmented internal thread 123, which runs in a plurality of segments within the grater container 12 and is actively connected with the external thread 1210. The segments with the external thread 1210 cover the inner wall of the grater container 12 from the insertion side 120 to the grating side 124.

The guiding elements 1220 of the driver element 122 are guided by the guiding element recesses 1211 in the feed disk 121. The driver element 122 connected with the feed disk 121 is then inserted through the insertion side 120 into the grater container 12, wherein the continuous external thread 1210 engages with the segmented internal thread 123 of the grater container 12.

The user of the grater according to the second embodiment above has to pass the guiding elements 1220 from above through the guiding element recesses 1211 and to move the feed disk 121 towards the collar 1222 before the driver element 122 with the attached feed disk 121 is inserted into the grater container 12. By the rotation of the driver element 122, the feed disk 121 is rotatably moved at the same time, and via the engagement of the external thread 1210 with the internal thread 123, a linear displacement of the feed disk in a direction of the longitudinal axis of the grater 1 takes place. Depending on the direction of rotation, the feed disk 121 is moved towards the insertion side 120 or the grating side 124.

Because the components of the grater 1 according to this invention are advantageously made of plastic, the necessary ease of the rotational movement and the linear movement of the feed disk 121 by active connection of the inner thread 123 with the outer thread 1210 can be easily achieved by the above described segmentation of one of the threads 123, 1210.

It is possible to provide right-hand threads or left-hand threads, wherein the grater 1 can be designed for right-handers or for left-handers.

The manufacturing of the internal thread 123 in the grater container 12 can be carried out carefully so that the feed disk 12 can easily be moved through the grater container 12. The internal thread 123, for example, can be cut continuously into the grater container 12 made of plastic. In addition, it is also possible to produce by the injection molding method, two semi-cylindrical halves of the grater container 12, each of them with an integrally formed internal thread 123, and subsequently to weld them together. The threads 123, 1210 used for the grater 1 can be selected as single-start or multi-start thread.

For some applications, it can be advantageous that the guiding elements 1220 of the driver element 122 are designed flexible so that the guiding elements 1220 can securely and firmly encompass the product 2 to be grated. This is advantageous, for example, for a grater 1 for grating of Schabziger 2, a Swiss cheese specialty from the canton of Glarus, because the Schabziger 2 is offered in the form of a truncated cone. A special embodiment is disclosed in FIG. 4, wherein it is indicated how the guiding elements 1220 can be guided past the circumferential surface of the truncated cone-shaped Schabziger 2.

The outer form of the grater container 12 can be selected so that it is adapted to the truncated cone-shaped Schabziger 2, which results in a truncated cone-shaped grater 1. Due to the active connection with the internal thread in the grater container 12, the feed disk 121 can be rotatably and linearly pressed and moved onto the product 2 to be grated. Depending on the linear position of the feed disk 121 within the grater container 12, the flexibly formed guiding elements 1220 are pressed more or less in a direction of the longitudinal axis of the grater 1, where the product 2 to be grated is encompassed by the guiding elements 1220. The guiding elements 1220 are deflected by the feed disk towards the center of the grater container 12. The product 2 to be grated is completely encompassed from all sides by the guiding elements 1220 until the grating is finished so that the Schabziger 2 can be completely grated.

After the feed disk 121 of the grater 1 according to this invention is guided from the insertion side 120 to the grating side 124 of the grater container 12 in active connection with the internal thread 123 in the grater container 12, the feed disk 121 can be removed at the grating side 124 from the grater container 12, and after the removal of the cover 11, can be inserted, connected with the guiding elements 1220, through the collar 1222 of the driver element 122 into the driver element 122. Thus it is not necessary to move the feed disk 121 back in an upward direction through the grater container 12 towards the cover 11 to position a new product 2 to be grated into the grater container 12 and to close the grater 1. Thus, the grater 1 can be filled quickly and in an uncomplicated manner after the completed grating of the product 2 to be grated and can be ready to use again.

Based on the construction, the grater 1 has a closed grater container 12 which cannot be opened unintentionally, whereby a user cannot contact unintentionally with the product 2 to be grated. Only for filling after the completed grating process, the grater container 12 is opened for a short time.

Swiss Patent Reference 00097/08, filed 24 Jan. 2008, the priority document corresponding to this invention, to which a foreign priority benefit is claimed under Title 35, United States Code, Section 119, and its entire teachings are incorporated, by reference, into this specification.

What is claimed is:

1. A grater for gratable food products with different hardness degrees, comprising a grater container (12) which can be closed with a cover (11) and in which a driver element (122) with a plurality of guiding elements (1220) is rotatively supported, and in which a feed disk (121) is supported linearly movable from an inserting side (120) of the grater container (12) to a grating side (124) in a direction of a longitudinal axis of the grater container (12), wherein a product (2) to be grated located in the grater container (12) can be guided by the driver element (122) across a grater insert (13) which is detachably mounted on the grating side (124) on the grater container (12), the grater comprising the feed disk (121) provided on a circumferential surface (1213) with an external thread (1210) in an active connection with an internal thread (123) located in the grater container (12), and the feed disk (121) linearly movable and pressible onto the product (2) to be grated within the grater container (12).

2. The grater according to claim 1, wherein the feed disk (121) comprises a plurality of guiding element recesses (1211) in which the guiding elements (1220) can be mounted and actively connected with the feed disk (121) so that during rotation of the driver element (122), the feed disk (121) is simultaneously carried.

3. The grater according to claim 2, wherein the external thread (1210) of the feed disk (121) is segmented and in active connection with a continuously formed internal thread (123) on an inner surface of the grater container (12).

4. The grater according to claim 3, wherein the guiding element recesses (1211) are arranged crossing the external thread (1210) in a periphery of the feed disk (121).

5. The grater according to claim 2, wherein the external thread (1210) of the feed disk (121) is formed continuously and is in active connection with a segmented formed internal thread (123) on an inner surface of the grater container (12).

6. The grater according to claim 5, wherein the guiding element recesses (1211) are spaced apart from a periphery of the feed disk (121) and from the continuous external thread (1210).

7. The grater according to claim 1, wherein at least one guiding element (1220) comprises a rib (1221) extending throughout a length of the guiding element (1220), and which is formed projecting into an interior of the grating container and moves the product (2) to be grated rotatively across the grater insert (13).

8. The grater according to claim 1, wherein the guiding elements (1220) of the driver element (122) are flexible, and the product (2) to be grated is retained within the grater container (12) in a plane parallel to the grater insert.

9. The grater according to claim 1, wherein an outer form of the grater container (12) corresponds to a form of the product (2) and encompasses the product (2) to be grated.

10. The grater according to claim 1, wherein the guiding elements (1220) are connected directly or indirectly detachable, or non-detachable with a collar (1222), and an insertion depth of the driver element (122) into the grater container (12) is limited.

11. The grater according to claim 1, wherein the guiding elements (1220) of the driver element (122) run at least approximately parallel to walls of the grater container (12).

12. The grater according to claim 10, wherein the collar (1222) of the driver element (122) is closeable with a cover (11) to seal the interior of the grater container (12) above the feed disk (121), and grater inserts (124) can be stored in a formed between space.

* * * * *